United States Patent [19]
Fouse et al.

[11] 3,732,523
[45] May 8, 1973

[54] BUS DUCT SYSTEM INCLUDING IMPROVED PLUG-IN POWER TAKE-OFF MEANS

[75] Inventors: Samuel S. Fouse; James R. Kotala, both of Aliquippa, Pa.

[73] Assignee: Westinghouse Electric Corporation, Pittsburgh, Pa.

[22] Filed: Oct. 12, 1971

[21] Appl. No.: 188,076

[52] U.S. Cl. .............................. 339/22 B, 174/71 B
[51] Int. Cl. ............................................ H01r 13/60
[58] Field of Search ..................... 339/22 R, 22 B; 174/68 B, 71 B, 88 B, 99 B

[56] References Cited
UNITED STATES PATENTS 3,346,776  10/1967  Olashan .............................. 317/117
3,042,889  7/1962   Johnston et al. ................... 339/22 B
3,391,378  7/1968   Fisher ................................ 339/22 B
3,376,377  4/1968   Fehr .................................... 174/72

Primary Examiner—Marvin A. Champion
Assistant Examiner—Robert A. Hafer
Attorney—F. Shapoe et al.

[57] ABSTRACT

A unitary section of bus duct with plug-in power take-off outlets in which there are a set of a plurality of elongated unitary bus bars having a pair of opposite wide faces and a pair of opposite narrow faces, the bus bars being disposed in an elongated housing in which there are spaced openings in the housing sides facing the wide faces of the bus bars, which openings are adapted for use with an adapter and a plug-in element, and conductor means leading from each bus bar to a corresponding plug-in element in the openings.

9 Claims, 5 Drawing Figures

BUS DUCT SYSTEM INCLUDING IMPROVED PLUG-IN POWER TAKE-OFF MEANS

CROSS REFERENCE TO RELATED APPLICATIONS

This application is related to the bus duct disclosed in the copending application of Charles L. Weimer and Samuel S. Fouse, entitled "Plug-in Bus Duct With Heat Dissipation Means", Ser. No. 146,204, filed May 24, 1971.

BACKGROUND OF THE INVENTION

1. Field of the Invention

This invention relates to a bus duct having plug-in regions for tapping off power.

2. Description of the Prior Art

Various types of bus ducts are disclosed in U.S. Pat. Nos. 3,459,872, 3,444,311, and 3,384,856 in which a plurality of bus bars are sandwiched between opposite housing members in compact relationship with each other to facilitate heat dissipation. The latter patent also discloses power take-off members in the edge-wise direction with regard to the bus bars.

One disadvantage of bus bars having large flat surfaces against the housing for transferring heat outside of the duct is a difficulty in adapting conventional power take-off units to this design. Special duct sections must be provided so that take-off units can be bolted to tie bars. Moreover, the take-off units must be field-mounted and as the duct dimensions change so must the dimensions of the take-off unit change, thereby requiring a large number of different units. For these reasons it is necessary to provide take-off units which extend to a plug-in support that is enclosed in a sheet metal housing having a constant width. The housing thereby serves as an adapter and is of such construction as to accept plug-in power take-off units of standard size.

Associated with the foregoing has been a need for an adaptor of constant width for use with feeder ducts of varying widths in order to permit the use of a one size power take-off unit. As a result a further advantage is obtained in that plug-in type units may be used instead of bolt-on type units. Plug-in units are much more desirable because they are easier to install and are interchangeable. Moreover, they may be readily moved from one location to another and are available from stock.

Finally, where feeder type bus duct is installed, it is not always convenient to connect a power take-off to the narrow side of the duct housing due to space limitations. Rather it is convenient to plug in a power take-off on the wider flat surface of the bus duct housing.

SUMMARY OF THE INVENTION

In accordance with this invention it has been found that the foregoing difficulties may be overcome by providing a bus duct system comprising a set of a plurality of elongated unitary bus bars having a pair of opposite wide faces and a pair of opposite narrow faces which are preferably disposed in a face-to-face compact relationship having longitudinally spaced regions where the bus bars are separated for the connection of plug-in power units on the wide face side of the housing and comprising conductor means for connecting each bus bar separately to spaced stabs to which a power plug-in unit is detachably mounted.

DESCRIPTION OF THE PREFERRED EMBODIMENTS

Figure 1:
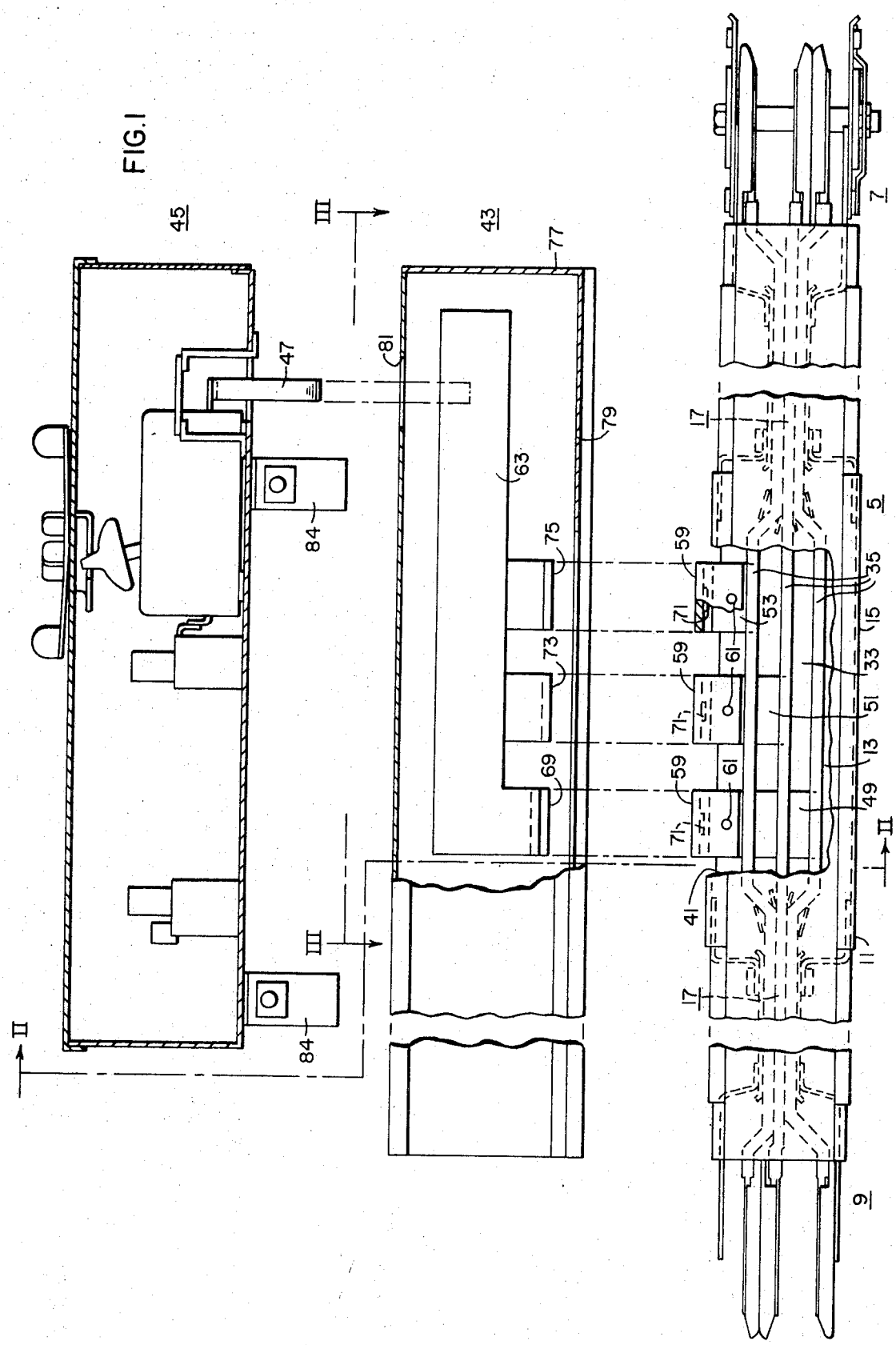
FIG. 1 is an exploded view of a section of bus duct, an adapter, and a plug-in element, in accordance with this invention.

In FIG. 1 an elongated section of bus duct is generally indicated at 5 and it comprises a first connecting-end part 7 at one end thereof, a second connecting-end part 9 at the other end thereof, a plurality of compact regions 11 intermediate the ends thereof, and at least one plug-in region 13 intermediate the ends thereof. The section 5 is an elongated unitary section including a unitary housing 15 and two sets of three elongated unitary bus bars 17 and 19 (FIGS. 1 and 2) supported within the housing 15. Only one of the compact regions 11 and only one of the plug-in regions 13 is specifically described in the drawings, it being understood that the description applies to all of the compact regions and plug-in regions.

Figure 2:
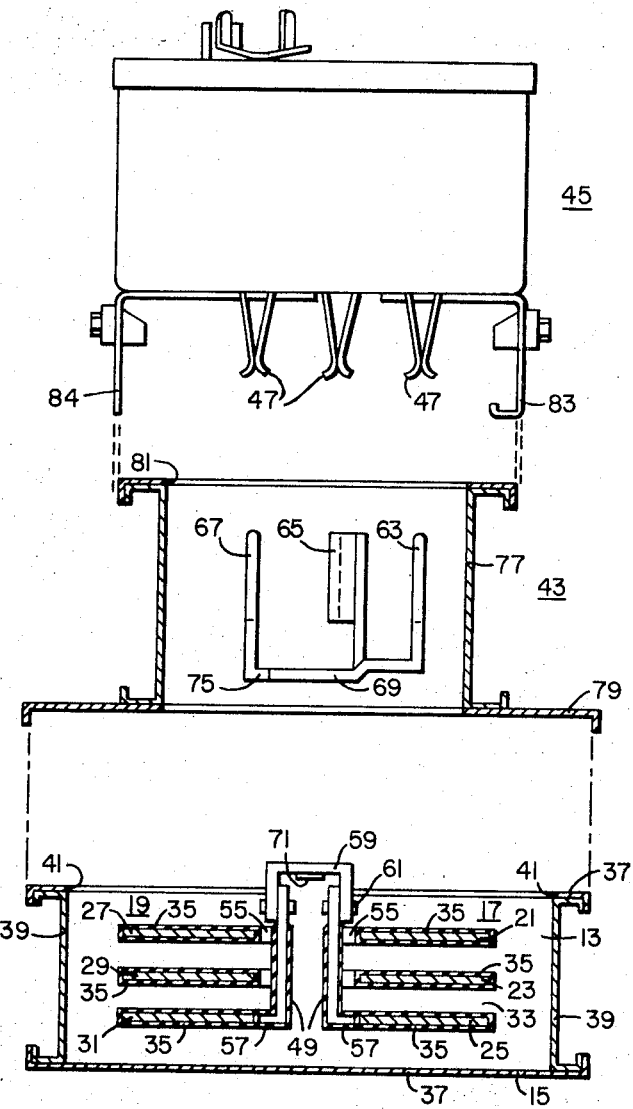
FIG. 2 is a vertical sectional view taken on the line II—II of FIG. 1.

As shown in FIG. 2 the set 17 of bus bars includes bus bars 21, 23 and 25 and the set 19 includes bus bars 27, 29, and 31. Each bus bar has upper and lower wide side surfaces and opposite narrow edge surfaces. The bus bars 21, 23 and 25 are stacked at the plug-in regions 13 (FIG. 2) with a clearance space 33 between each bar. The bars 27, 29, and 31 are similarly disposed. At the compact regions 11 the bus bars 21, 23, and 25 are sandwiched together in a compact relationship without any clearance space therebetween. The bars 27, 29, and 31 are similarly disposed at the compact region.

Each of the bus bars 21-31 comprises an electrical conducting bar and an electrically insulating sleeve 35 which sleeve may be composed of sheets or tape of insulating material wrapped around each bar; or, preferably, the insulating material is composed of a resin that is a heat hardenable polymer, such as polyester resins including oil-modified polyesters, epoxy, polyurethane resins which may be applied by conventional fluidized bed procedures, or electrostatic spraying. The insulating sleeves 35 are coextensive with each bar 21-31 throughout the length of the housing 15. Each bar 21-31 is composed of a metal having a good coefficient of electrical conductivity, such as copper or aluminum.

The housing 15 comprises a first pair of opposite housing members 37 (FIG. 2) and a second pair of opposite housing members 39 which cooperate to provide an elongated tubular housing structure. That housing structure as well as the section of bus duct are more particularly described in said copending application Ser. No. 146,024. In summary, the bus bars are disposed in a generally stacked relationship in sets of three bars and comprise a pair of opposite wide side surfaces and a pair of opposite narrow edge surfaces so that the wide side surfaces are disposed parallel to and between the opposite housing members 37 and the opposite narrow edge surfaces of the bars are disposed substantially parallel to and between the opposite housing members 39. Thus, the first pair of housing members 37 are wide side surfaces compared to the narrower edge surfaces of the opposite housing members 39.

As shown in the drawings, one of the wide housing members 37, such as the upper side, is provided with an opening 41 at the plug-in region 13 (FIG. 2) to provide access to the bus bars 21–31 by an adapter 43 in conjunction with a plug-in element 45 having a plurality of spaced stabs 47. It is noted that the plug-in element 45 is attached to the wide side of the housing instead of the narrow side as in bus ducts of prior construction.

For that purpose a set of L-shaped connectors 49, 51, and 53 (FIGS. 1 and 2) is provided within the section and between each set of bus bars 21, 23, and 25, one set of connectors for each set of bus bars. Each connector 49 extends from the lowermost bus bar 25 or 31 to which it is connected electrically in a suitable manner such as a braze or weld 55, a brazed joint being suitable for copper bus bars and a welded joint being preferable for aluminum bus bars. As shown in FIG. 2 the L-shaped connector 49 is secured to the narrow edge surface of the bus bar 25 and has an insulation coating 57 of a material similar to the insulating sleeves 35 on the bus bars. In a similar manner, the L-shaped connectors 51 and 53 are attached to the bus bars 23 and 21, respectively. Similar connectors 49, 51, and 53 are attached to the bus bars 27, 29, and 31, respectively. All of the connectors for both sets 17 and 19 of bus bars extend upwardly to a location near the opening 41 of the housing member 37, where each pair of connectors 49, 51 and 53 are secured together by an inverted U-shaped bridge connector 59 in a suitable manner such as by bolts 61.

Figure 3:
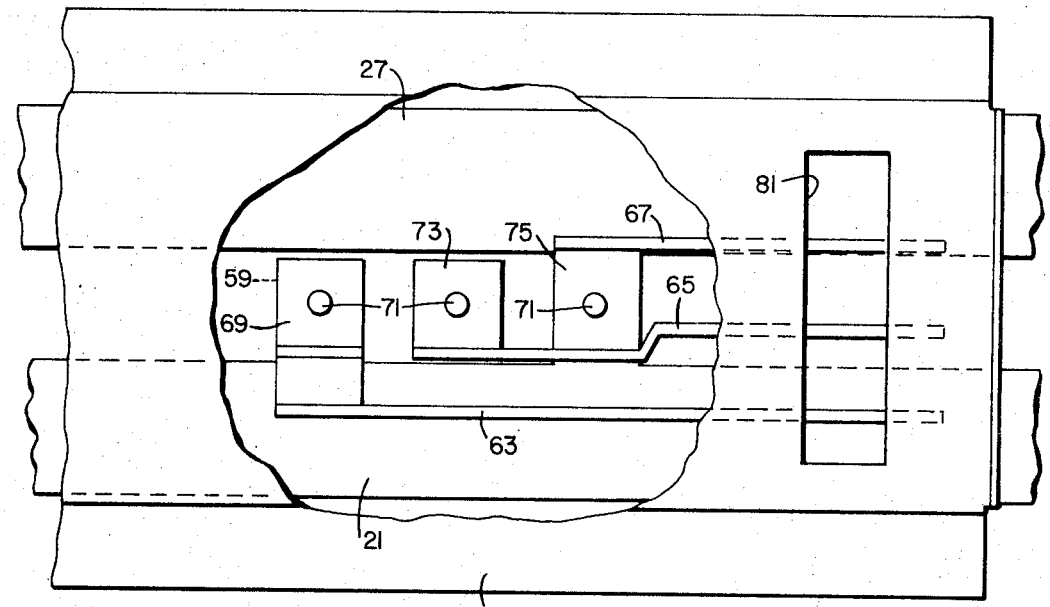
FIG. 3 is a horizontal sectional view taken on the line III—III of FIG. 2.
Figure 5:
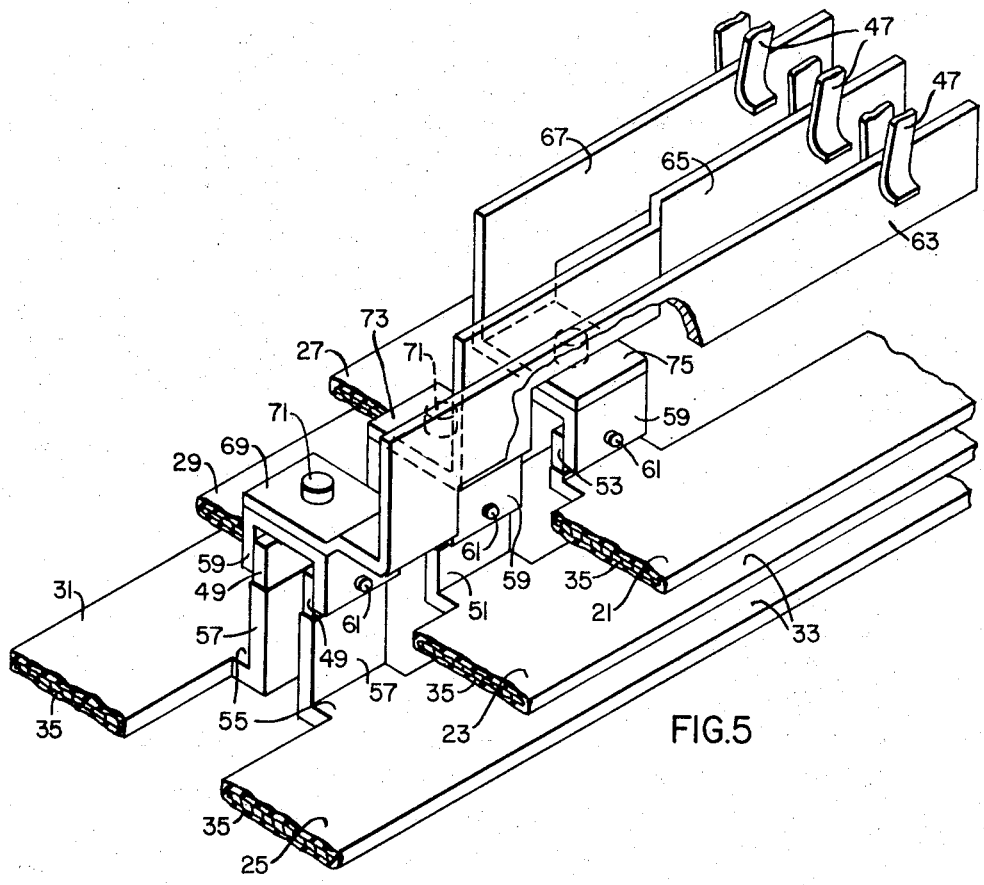
FIG. 5 is an isometric view of three conductor bars of this invention.

As shown in FIGS. 2, 3 and 5 the adapter 43 includes three conductor bars 63, 65, and 67, with one bar being connected to one pair of bus bars 25 and 31, 23 and 29, and 21 and 27, respectively. The conductor bar 63, being typical of all of the conductor bars 63, 65 and 67, includes a horizontal portion 69 which is attached to a corresponding connector 59 in a suitable manner such as a plug nut 71. The conductor bar 65 is likewise provided with a portion 73 which is attached to a similar connector 59 (FIG. 1) corresponding to the bus bars 23 and 29. Finally, the conductor bar 67 is provided with a portion 75 which is attached to a connector 59 corresponding to the bus bars 21 and 27. Thus, separate connector bars are provided for each corresponding pair of bus bars which connector bars are disposed within an enclosing housing 77 having a base 79 for the adapter which is mounted on the top side of the bus duct above the opening 41. The housing 77 in turn has an opening 81 above the conductor bars 63, 65, and 67 whereby the bars are available for engagement by stabs 45 of a conventional plug-in element 45. For that purpose the element 45 may be provided with clamping flanges 83 and 84 for engagement with the adapter.

As can be understood the adapter 43 is disclosed in conjunction with the spaced portions of the several bus bars 21–31 at the plug-in region 13. However, the adapter may be used in conjunction with the several bus bars in the compact regions 11. Thus, there is no particular space relationship required between the plug-in unit 45 and the portion of the bus bars 21–31 having clearance spaces 33 therebetween.

Figure 4:
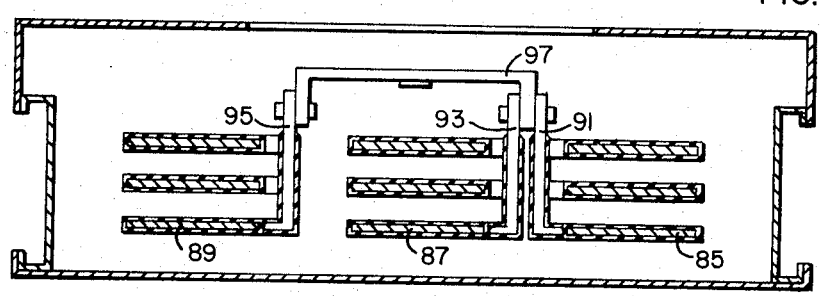
FIG. 4 is a vertical sectional view showing a modification of the invention.

Moreover, as shown in FIG. 4 a modified adapter may be used in conjunction with more than two sets of bus bars such as three sets (FIG. 4), whereby three bus bars per phase are provided. In the embodiment shown in FIG. 4 three bus bars 85, 87, and 89, for example, are provided for one of three phases and are connected by suitable connectors 91, 93, and 95 respectively, to an inverted U-shaped bridge connector 97 which in turn is connected to a conductor bar similar to the bar 63 in a manner similar to the bridge connector 59 in FIG. 2.

As shown in FIG. 1 the bus bars 17 are off-set at the connecting end part 7 as well as the connecting end part 9. Each bus bar is provided with suitable interconnecting means including insulating spacing members in a manner similar to that disclosed in the copending application Ser. No. 146,204. Accordingly, it is understood that two similar sections of bus ducts are connectable in an end-to-end relationship with at least one of the sections being movable longitudinally relative to the other section in order to provide the sections in an overlapping relationship.

Finally, it is pointed out that the device of this invention provides for connection of a plug-in unit to tap-off power in a direction that is generally perpendicular to the broad side of the bus duct and/or the housing 15, rather than parallel thereto.

What is claimed is:

1. A unitary section of bus duct with power take-off means, said section comprising an elongated housing, a set of a plurality of elongated unitary bus bars, each bus bar comprising a pair of opposite wide side surfaces and a pair of opposite narrow edge surfaces, the bus bars being disposed in the housing in a generally stacked relationship, at least one plug-in region along the length of the section and comprising opening means in the housing and facing the wide side surface of the bus bars and for receiving a plug-in element, and conductor means extending from one narrow edge of each bus bar to the opening means for engagement with a plug-in element.

2. The unitary section of the bus duct of claim 1 in which the bus bars are disposed in surface-to-surface compact relationship.

3. The unitary section of the bus duct of claim 1 in which the plug-in element includes a set of spaced stabs.

4. The unitary section of the bus duct of claim 3 in which the conductor means includes a conductor extending from each bus bar to a corresponding stab of the plug-in element.

5. The unitary section of the bus duct of claim 3 in which the bus bars are spaced at the plug-in region.

6. The unitary section of the bus duct of claim 1 in which the bus bars have a plurality of alternately disposed compact and spaced regions, and the number and location of the plug-in regions corresponds to those of the spaced regions.

7. The unitary section of the bus duct of claim 1 in which the set of bus bars have a first connecting end part at one end thereof and a second connecting end part at the other end thereof.

8. A unitary section of bus duct with power take-off means, said section comprising an elongated housing, a set of a plurality of elongated unitary bus bars, each bus bar comprising a pair of opposite wide side surfaces and a pair of opposite narrow edge surfaces, the bus bars being disposed in the housing in a generally stacked relationship, at least one opening means in the housing and facing the wide side surface of the bus bars, an electrical connector extending from each bus bar to the opening means, each connector being attached to a narrow edge surface of a corresponding bus bar, an adapter mounted on the housing and over the opening means and having a conductor extending from each connector to a region where the conductors are in spaced positions of each other, and each conductor being detachably secured to its corresponding connector, whereby the conductors are adapted for detachable engagement with a plug-in power take-off device.

9. The unitary section of bus duct of claim 8 in which the adapter includes a housing having opening means aligned with the spaced positions of the conductors, and the opening means being receptive of conductor-engaging electrical means for taking off power from the bus bars.

* * * * *